Dec. 25, 1962 P. E. OHMART ETAL 3,070,692
SEWAGE SLUDGE DENSITY MEASURING APPARATUS
Filed Feb. 19, 1960 3 Sheets-Sheet 1

INVENTORS.
Philip E. Ohmart,
BY Henry L. Cook, Jr.
Wood, Herron & Evans
ATTORNEYS.

Dec. 25, 1962   P. E. OHMART ETAL   3,070,692
SEWAGE SLUDGE DENSITY MEASURING APPARATUS
Filed Feb. 19, 1960   3 Sheets-Sheet 2
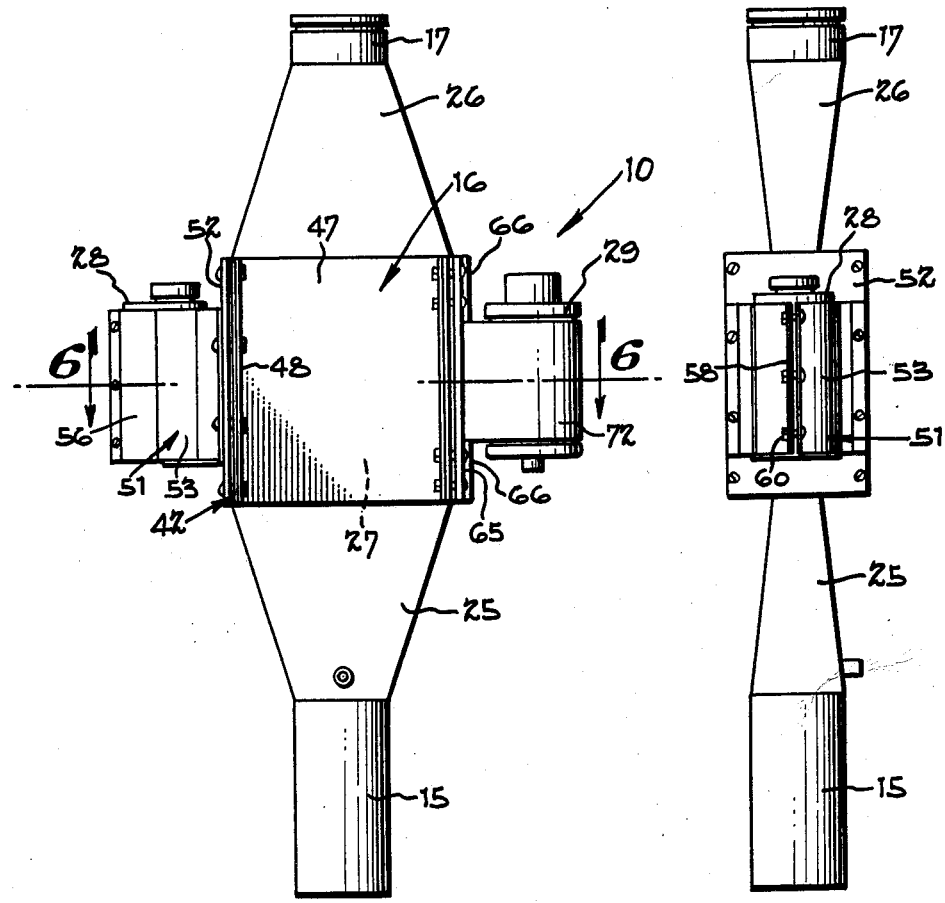
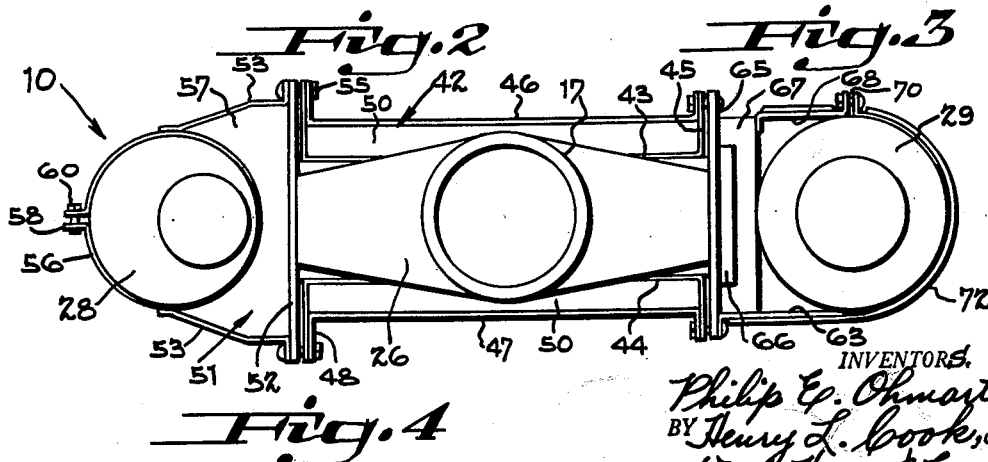
INVENTORS.
Philip E. Ohmart.
BY Henry L. Cook, Jr.
Wood, Herron & Evans.
ATTORNEYS.

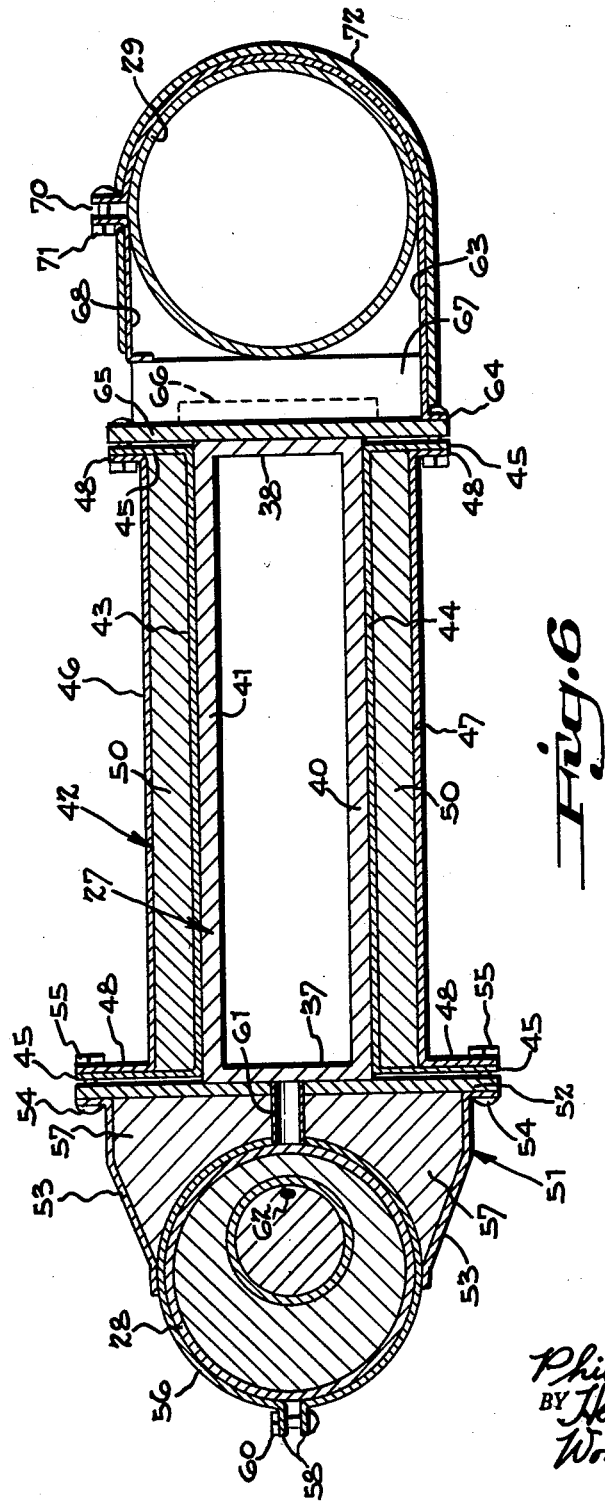

# United States Patent Office 3,070,692
Patented Dec. 25, 1962

---

3,070,692
SEWAGE SLUDGE DENSITY MEASURING
APPARATUS
Philip E. Ohmart and Henry L. Cook, Jr., Cincinnati, Ohio, assignors to The Ohmart Corporation, Cincinnati, Ohio, a corporation of Ohio
Filed Feb. 19, 1960, Ser. No. 9,799
6 Claims. (Cl. 250—43.5)

This invention relates to sewage treatment apparatus and is particularly directed to apparatus for measuring the density of sewage sludge and providing electrical signals which can be employed to control sludge pumps and the like.

The measuring apparatus of the present invention is particularly useful in the measurement of percent solids present in sludge pumped to the digester in sewage disposal plants. In a typical modern sewage treatment plant, sewage is initially passed through sedimentation tanks and the sludge settling from the sewage is carried by sweeps to hoppers disposed at the inlet ends of the tank. This sludge is pumped from the bottom of the hoppers to a digester. After a period of several days the sludge is taken from the digester to dewatering equipment which may be in the form of a centrifuge, drying bed, or the like.

In a sewage disposal plant of this type, it is of extreme importance to control in some manner the pumping of sludge so as to obtain a sludge of constant density. The accuracy of this control directly affects the required capacity of the various units of the digesting system; for if an excessively thin sludge is pumped, a larger digester capacity is required. Since the digesters represent approximately 30% of plant construction cost, any saving in digester capacity represents a saving in overall construction cost. Moreover, it is necessary to provide a boiler having a sufficient capacity to maintain unvarying temperature in the digester. The saving in boiler capacity by treating a thick sludge is also very substantial. For example, if the average content of sludge can be increased from four to six percent boiler capacity can be reduced thirty-three percent. This represents an important saving not only in first cost, but also in operating costs as well.

Previously, many different methods were tried in attempts to control the density of sludge being pumped. For example, it was proposed to provide an open box in which an attendant could view the sludge being pumped. Sight glasses were also tried, but these methods, which depended upon human observation, were not sufficiently accurate to provide optimum results. It was also proposed to provide timers to control the operation of the sludge pumps on a time cycle. This, too, did not prove to be satisfactory, since the rate of accumulation of sludge in the hopper was not uniform. Various electrical methods were also tried, such as the provision of current sensitive relays on the pump motors. These methods also proved to be too erratic for satisfactory use.

The principal object of the present invention is to provide a novel apparatus for measuring sludge density by means of a radiation sensitive density measuring device. Essentially, the apparatus comprises a transition pipe section placed in the sludge pipe line. A source of radioactive material is mounted on one side of the transition section and a detector, preferably but not necessarily a radiant energy electric generator or "Ohmart Cell," of the type shown in Philip E. Ohmart Patent No. 2,737,592 is placed on the opposite side of the transition section. A beam of the radiation emitted by the radioactive source passes through the sludge stream. A portion of this radiation is absorbed while the remainder of the beam not absorbed by the sludge impinges upon the detector. If the sludge density increases, more of the radiation is absorbed by the stream and less radiation impinges upon the detector. Should the sludge density decrease, less radiation will be absorbed by the sludge and more radiation will impinge upon the detector. As is explained below, the detector is effective to cause a current flow, the magnitude of which is correlated with the amount of radiation impinging upon the detector. Hence, this current flow is correlated with the sludge density.

One of the principal objects of the present invention is to provide an apparatus which will be effective to measure sludge density with maximum accuracy. The accuracy of this measurement is complicated by the nature of the sludge itself, for the sludge stream is not homogeneous in cross section, but rather constitutes a relatively small percentage (of the order of 5%) of solids in a fluid stream. These solid particles have a tendency to settle whenever the sludge velocity is substantially reduced. Any settling of solids results in highly erroneous measurements of density. Also, the sludge stream is not normally homogeneous so that a measurement of the density of one portion of the stream may not be representative of the density of the entire stream.

The present invention is based in part upon the empirical discovery and determination that accurate measurements of sludge density can be made by providing a transition section in the flow line having an elongated narrow path for the radiation to flow in a direction transverse to the sludge flow. The transition section further comprises tapered inlet and outlet portions. Specifically, the preferred embodiment of transition section is vertically disposed and comprises two tapering endwise portions constituting an inlet portion and an outlet portion and a measuring section of rectangular cross section disposed between the inlet and outlet portions. The measuring section has an elongated dimension extending horizontally, transverse to the direction of fluid flow and of a length substantially greater than the diameter of the sludge discharge pipe. The width of the section is preferably made relatively narrow, at least as narrow as the width of the detector. Collimating means are provided so that the radiation is directed in a collimated beam through the measuring section along its longest dimension.

The present apparatus including the transition section provides several advantages. In the first place, the cross sectional area of the section is sufficiently small so that in relation to the cross sectional area of the pipe a relatively high velocity of sludge is maintained. This prevents the solids from settling out in the transition section and causing erroneous sludge density readings.

In the second place, the transition section is provided with a tapered inlet portion which results in a very turbulent flow within the transition section so that the sludge in the section is relatively homogeneous and the portion of the sludge traversed by the radioactive beam is representative of the entire sludge stream.

A still further advantage of the present apparatus including a narrow transition section is that the current change produced by the detector by a given density change is increased over the change which is obtained if the measurement is made in a cylindrical pipe section of a diameter equal to the elongated dimension of the transition section.

An additional advantage of the present apparatus is that it is extremely simple to calibrate initially and to maintain in accurate calibration. As is explained in detail below, in the preferred embodiment the measuring cell is connected in parallel combination with a compensating cell as is explained in Ohmart Patent No. 2,763,790. In order to calibrate the equipment, the output of the compensating cell is initially adjusted so that a zero net current output is obtained when water (specific gravity 1.00) is present in the transition section.

The net current output of the measuring and compensating cells varies substantially linearly with changes in sludge density so that it is necessary to provide only one other point of calibration which is readily obtained by filling the transition section with another material of known density, such as brine. Moreover, while in actual use there has been an unexpectedly small grease build-up on the interior of the transition section, should this build-up occur in any installation, its effect can be eliminated by merely adjusting the compensating cell.

These and other objects and advantages of the present invention will be more readily apparent from a consideration of the following detailed description of the drawings illustrating one preferred embodiment of the invention.

In the drawings:

FIGURE 2 is an enlarged front view of a preferred form of sludge density measuring apparatus.

FIGURE 3 is an end view of the apparatus shown in FIGURE 2.

FIGURE 4 is a top plan view of the apparatus shown in FIGURE 2.

FIGURE 6 is a horizontal cross-sectional view taken along line 6—6 of FIGURE 2.

Figure 1:
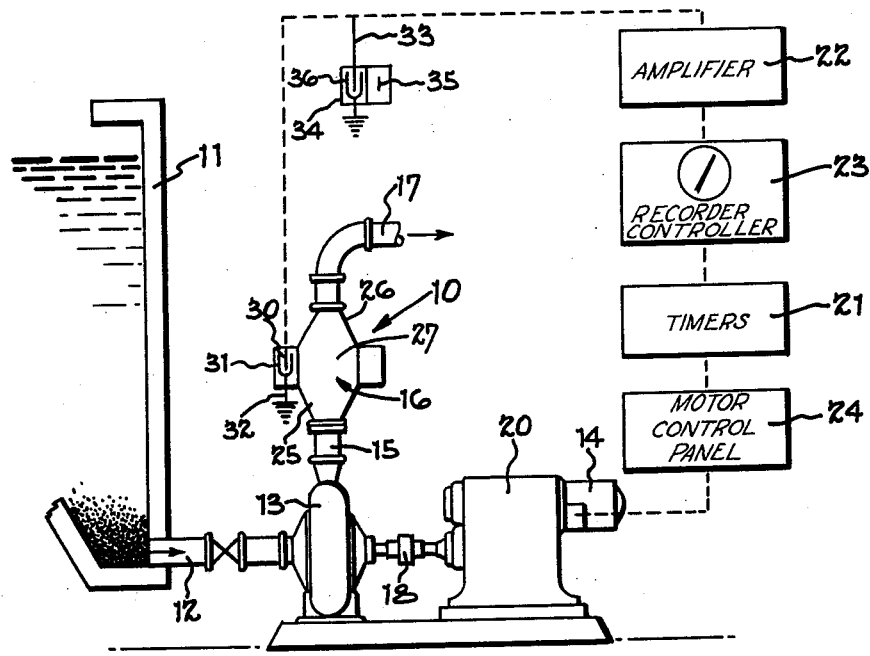
FIGURE 1 is a schematic diagram showing the present sludge density measuring apparatus installed in a sewage treatment system.

FIGURE 1 shows how the present sludge density measuring apparatus, indicated generally at 10, can be incorporated in a sewage disposal plant. It is to be understood at the outset, however, that the details of the sewage disposal system constitute no part of the present invention and that it is contemplated that the present sludge density measuring control equipment can be utilized in other portions of a sewage disposal system than that shown in FIGURE 1.

In the sewage disposal system shown in FIGURE 1, sewage is passed through sedimentation tanks and sludge is carried by sweeps to hopper 11 disposed at the ends of the tank. The hopper 11 is provided with an outlet line 12 connected to a pump 13 driven by an electric motor 14. The outlet line 15 of pump 13 is connected to a transition pipe section 16. This transition pipe section 16 is in turn connected through pipe 17 to a digester not shown.

In the remaining portions (not shown) of a conventional sewage disposal plant, means are provided for transferring sludge from the digester and dewatering it either by vacuum filtration apparatus, by centrifuging equipment, or by means of a sludge drying bed.

More particularly, in a preferred system, as is shown in FIGURE 1, sludge is pumped from tank hopper 11 by means of a Wemco torque flow pump, although other types of pumps, such as centrifugal pump, can be employed. Pump 13 is driven from motor 14 through a suitable coupling 18 and gear reduction unit 20. In the present system the operation of the motor 14 and pump 13 are automatically controlled by the combination of timers 21 and relays activated by signals from density measuring apparatus 10. Signals from density measuring apparatus 10 are amplified by means of an amplifier 22. As is shown diagrammatically in FIGURE 1, the amplifier 22 is preferably connected to a suitable recording and controlling device 23. The details of the amplifier, recorder-controller, and timers, as well as the circuit connections of motor control panel 24, constitute no part of the present invention, which is concerned solely with sludge density measuring apparatus 10.

In a typical installation, the sludge is pumped from hopper 11 through a six-inch diameter line. That is, lines 15 and 17 are of six inches in diameter. In order to provide a clear understanding of the present invention, this six inch diameter will be used by way of example; however, it is to be clearly understood that the present invention can be used with pipes of either a smaller or larger diameter and that the dimensions of transition pipe section 16 will be varied accordingly.

The function of sludge density measuring apparatus 10 is to provide an electrical signal which will be accurately correlated with the density of sludge pumped by pump 13 to the digester. This output signal is amplified by amplifier 22 and is used to control the operation of motor 14 and pump 13 so that the pump is operated only when the sludge density is above a predetermined figure, for example 5.2% of solids.

The details of the density measuring apparatus 10 are best shown in FIGURES 2–6. As is there shown, the apparatus comprises a transition pipe section 16 connected to the outlet line 15 of pump 13. As was explained above, sludge is pumped through transition section 16 and is discharged from that section to pipe 17, which is in turn connected to the digester inlet. Transition pipe section 16 is configured to form a tapering inlet portion 25, a tapering outlet portion 26 and an intermediate measuring section 27. The measuring section 27 is preferably rectangular in cross section and has an elongated side substantially longer than the diameter of pipe section 15. In a preferred embodiment, the inner longitudinal dimension of this measuring section is 14 inches. The width of the measuring section is in turn appreciably narrower than the width of connecting pipe 15 and in one preferred embodiment is three inches.

The transition pipe section 16 has a source holder 28 mounted on one side thereof and a detector 29 mounted on the opposite side thereof. The source holder 28 carries a source of suitable radioactive material, such as a point source of cesium 137 which emits gamma rays. One preferred form of detector 29 is a radiant energy electric generator, or "Ohmart Cell," generally similar to the cell disclosed in Philip E. Ohmart Patent No. 2,737,592 for "Density Responsive Apparatus." It will be understood however, that the present transition section 16 can also be advantageously used in conjunction with other types of detectors such as ion chambers, Geiger counters, scintillation counters, or solid state detectors.

The exact details of construction of the radio-electric generator employed in the preferred embodiment constitute no part of the present invention and these details are fully disclosed in Patent No. 2,737,592. Briefly, however, it can be stated that the radiant energy electric generator comprises a generally cylindrical casing which is pervious to ionizing radiations and encloses two spaced electrodes having dissimilar metallic surfaces, e.g., zinc and lead dioxide. The electrodes are mounted in spaced relationship to one another and are electrically insulated from one another. The housing is filled with a suitable ionizable gas, such as argon, which contacts both electrodes. Suitable electrical leads are taken from the two electrodes and are connected to a compensating cell.

As is explained in Patent No. 2,737,592 the more noble electrode functions as a positive electrode, this electrode being numbered 30 in the schematic drawing of FIGURE 1. The more active electrode becomes the negative electrode. This electrode is indicated at 31 in FIGURE 1 and is grounded as at 32. Positive electrode 30 is connected to the negative electrode 33 of compensating cell 34. Compensating cell 34 is a second radiant energy electric generator having its own source of radioactive material 35. The positive electrode 36 of compensating cell 34 is grounded so that the compensating cell and measuring radiant energy electric generator 29 are placed in electrical parallel opposition.

The manner in which two "Ohmart Cells" connected in this manner function is disclosed in detail in Philip E. Ohmart Patent No. 2,763,790 and a portion of this disclosure is also incorporated in Patent No. 2,737,592. As there explained, the function of the compensating cell is to produce a current of opposite polarity to that of the measuring cell or detector 29. As further explained in the above mentioned patents, connecting two radiant energy electric generators in short-circuit relationship does not in any way damage the generators, but rather facilitates the operation of the generators at their maximum sensitivity by minimizing the potential developed by the generators.

When two Ohmart cells are connected in parallel opposition with an external load resistance such as an indicating mechanism, and each of the cells produces the same current, the positive ions formed in each cell will be neutralized by electrons flowing from the other cell in which they have been freed and collected. While in such a case the current flowing through the cells is maximum, no current flows in the external circuit, and substantially no potential difference exists between the two electrodes of each cell.

When, however, the output of one of the cells is reduced or increased so that it differs from the output of the other cell, one of the cells will become dominant and cause a current flow through the external circuit, that is, more ions will migrate to its positive electrode than can be neutralized by the electrons supplied by the other cell. In this event, the dominant cell will force its excess electrons through the external circuit to neutralize the excess ions collecting on its positive electrode. Simultaneously, the potential of the dominant cell will rise to the magnitude required for the passage of these electrons through the circuit. This potential rise of the dominant cell, or the current flow through the external circuit constitute the net output signal of the two cells. Obviously, in the present embodiment, the polarity of the voltage and the direction of current flow will depend upon whether the measuring or the compensating cell dominates, and the magnitude of each will reflect the difference in the output of the two cells.

The net current output of the measuring cell 29 and compensating cell 34 is applied to amplifier 22. After amplification, the signals are applied to recorder-controller 23 which incorporates relays effective for controlling the operation of motor 14 in conjunction with timers 21. It will be understood that controller 23 can govern the operation of other flow regulators if desired.

As is best shown in FIGURES 2, 3, and 6, transition pipe section 16 is formed of a suitable material, such as one-half inch steel plate sections, welded or otherwise secured together to form tapering inlet portions 25 and 26 and measuring section 27. The measuring section 27 comprises two narrow end walls 37 and 38 and two elongated side walls 40 and 41 which define an elongated measuring section for the sludge material being pumped.

Figure 5:
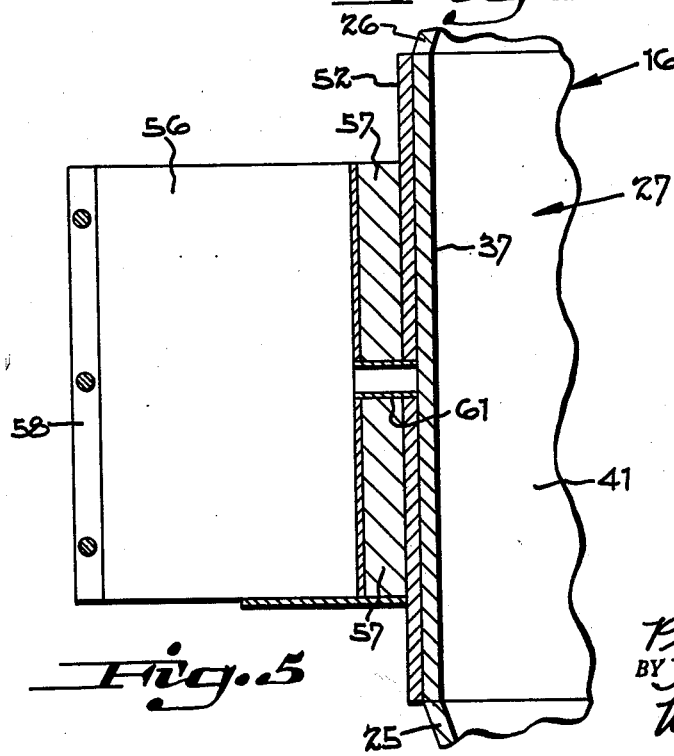
FIGURE 5 is a partial vertical sectional view taken through one wall of the control apparatus adjacent to the radioactive material source holder.

As is shown in FIGURES 5 and 6, measuring section 27 is shielded by means of suitable radiation absorbent material. More particularly, this section of the transition member 16 carries a shielding and mounting assembly 42. Assembly 42 includes sheet material side panels 43 and 44 which abut the outer surface of side walls 40 and 41 of the transition section. Each of the side panels 43 and 44 is provided with an outwardly extending flange 45—45 at each end of the panel. A second outer panel 46, 47 extends in parallel spaced relationship to each of the panels 43 and 44 respectively. Outer panels 46 and 47 are each provided with outwardly extending flanges 48 at each end thereof, flanges 48 residing in abutment with flanges 45 of inlet panels 43 and 44. The space between the inner and outer panels is filled with a suitable shielding material, such as lead, indicated at 50.

A source mounting member 51 is bolted to flanges 45 and 48 adjacent to end wall 37 of the transition section. This source mounting unit comprises a vertical plate 52 which resides in abutment with end wall 37 and flanges 45. This plate in turn carries side walls 53, the side walls 53 and vertical plate 52 being bolted to flanges 45 and 48 by means of bolts 54 and nuts 55. A clamping ring 56 is welded or otherwise secured to the ends of side wall member 53. Clamping ring 56 is spaced from plate 52 and the area between these members is filled with suitable absorbent material, such as lead 57. The clamping ring 56 is split and is provided with two outwardly extending opposed flanges 58. Any suitable form of source holder 28 is placed within clamping ring 56 and is securely held in place by tightening nuts 60. A small circular opening is formed in clamping ring 56 and similar aligned openings are formed in lead section 57 and plate 52. A short length of tubing 61, such as a one inch by sixteen gage tube, is inserted through these openings and abuts end wall 37 of the transition section. As is shown in FIGURES 5 and 6, the axis of tube 61 is directed horizontally across measuring section 27. The axis of the tube is disposed midway between the side wall 40 and 41 of the measuring section and is located in substantially the vertical mid-point of end walls 37.

The details of source holder 28 are not illustrated. However, it will suffice to say that the source holder 28 includes a casing which encloses a concentrated point source of cesium 137 or other suitable radioactive material together with suitable shielding for absorbing radiation in any direction except through tube 61. The source of cesium indicated diagrammatically at 62 is disposed on the axis of tube 61. Consequently, the source is shielded so that is projects a small collimated beam of gamma radiation through tube 61 and across measuring section 27.

The opposite end wall 38 of the measuring section carries a cell mounting clamp 63. Clamp 63 is provided with an outwardly extending flange 64 bolted to a plate 65 in abutment with end wall 38 and to flanges 45 and 48.

Plate 65 carries upper and lower vertical shielding plates 66 which are disposed along the face of plate 65 above and below the detector housing. Two horizontal plates 67 extend outwardly from plate 65 and form a forward abutment for the detector housing. A segment 68 of clamping ring 63 is welded or otherwise secured to these plates, the clamping ring being split as at 70 to provide means for holding the cell housing in place by tightening nuts 71. A strip 72 of suitable shielding material, such as lead, surrounds the clamping ring and is elective to shield the detector from stray radiation.

In operation, after the measuring and compensating cells have been installed and connected to the recorder-controller, the system is calibrated by first placing fresh water in the transition section. The current output of the compensating cell is then adjusted to give a zero reading on the recorder. This zero reading corresponds to 1.0 specific gravity and zero percent solids. Since the percent of solids with which the normal sewage plant is concerned lies in the 0–10 percent range, the unit is next calibrated to provide one or more readings at the upper end of this range. One method of doing this is by filling the transition section with brine having a specific gravity of 1.0245 corresponding to raw sludge having approximately 8.2% solids.

The specific gravity and density of the sludge varies substantially linearly with the percentage of solids. Also, as explained in the patents referred to above, the net current output of the detector and compensating cell also varies in a substantially linear manner with changes in density. Thus there is a substantially linear change of current with percent of solids. This greatly simplifies calibration of the unit.

In actual operation, assuming the sludge pump is being driven and is pumping sludge in excess of a predetermined percent of solids, for example 5.2% solids, the pump will continue operating until the percentage of solids in the transition section drops below 5.2%. When the sludge drops below this level, the net current output from the measuring cell and compensating cell, which is applied to amplifier 22, becomes sufficiently large to actuate mercury switches in the recorder-controller. These switches are placed in circuit connection with the electric motor 14 and open the motor circuit. The motor is immediately stopped and a start timer is energized. This timer is effective to start the sludge pump after a predetermined off interval, for example 30 minutes. At that time, control of the pump is transferred to a second or time delay timer. This second timer is effective to override the density measuring control when the pump is initially started so that the pump operates for a sufficient length of time, for example one and one-fourth minutes, to insure that a new supply of raw sludge has reached the transition section before the control of the pump is again transferred to the density responsive apparatus. When the second timer runs out, control of the pump is returned to the recorder-controller 23 and the pump continues to operate until the sludge again thins out below the 5.2% level.

In operation, the accuracy of the present density measuring apparatus is greatly improved due to the shape of the transition section. In the first place, the cross-sectional area of the section provides an elongated sample path for traverse by the radiation which path is of 2½ times the length of path across the pump outlet pipe section. At the same time, the configuration of the inlet and outlet portions of the transition section in conjunction with the rectangular measuring section impart a high turbulence to the sludge stream so that the sludge stream is relatively homogeneous and the portion exposed to the radiation presents a true sample of the sludge stream.

Moreover, the cross-sectional area of the measuring section is only one-third that of a cylindrical section providing the same sampling path. Thus, the velocity of the sludge stream is maintained relatively high, thereby preventing any settling of the sludge solids in the measuring section. Finally, the very narrow width of the measuring section minimizes back scattering of angularly directed rays onto the measuring cell with increases in density. This results in a greater change in radiation and hence current with changes in density.

Having described our invention, we claim:

1. In a sewage treatment system of the type including a pump for pumping sewage sludge through a pipe line from a tank to a digester, the improvement which comprises, means for measuring the density of sludge being pumped, said means comprising a transition pipe section connected in said pipe line, said transition section comprising a tapered inlet portion, a tapered outlet portion, and a measuring portion disposed intermediate said inlet portion and said outlet portion, said measuring section having an internal elongated dimension substantially greater than the diameter of said pipe line, said elongated dimension extending transverse to the direction of fluid flow from the inlet to the outlet portions of said transition section, the measuring section of said transition section having two narrow ends of a width substantially smaller than the diameter of said pipe, the configuration of said transition section being effective to create a turbulent flow, increasing the homogeneity of the sludge stream in the measuring section, a point source of radioactive material, means mounting said point source of radioactive material adjacent to one narrow end of said transition section, a detector effective to cause a current flow correlated with the amount of radiation impinging upon said detector, and means mounting said detector adjacent to the opposite end of said measuring section, whereby radiation from said source passes through said measuring section and the amount of radiation impinging upon said detector is attenuated by said sludge, the configuration of said measuring section being effective to reduce back scattering of radiation from said radioactive material onto the detector, and measuring apparatus in electrical connection with said detector.

2. In a sewage treatment system of the type including a pump for pumping sewage sludge through a pipe line from a tank to a digester, an electric motor for driving said pump and control means for controlling said electric motor, the improvement which comprises, means for measuring the density of sludge being pumped, and producing an electrical current flow which varies with said density, said current being effective to actuate said control means, said means comprising a transition pipe section connected in said pipe line, said transition section comprising a tapered inlet portion, a tapered outlet portion and a measuring portion disposed intermediate said inlet portion and said outlet portion, said measuring section having an internal elongated dimension substantially greater than the diameter of said pipe line, said elongated dimension extending transverse to the direction of fluid flow from the inlet to the outlet portions of said transition section, the measuring section of said transition section having two narrow ends of a width substantially smaller than the diameter of said pipe, the configuration of said transition section being effective to create a turbulent flow, increasing the homogeneity of the sludge stream in the measuring section, a point source of radioactive material, means mounting said point source of radioactive material adjacent to one narrow end of said transition section, a detector effective to cause a current flow correlated with the amount of radiation impinging upon said detector, and means mounting said detector adjacent to the opposite end of said measuring section, whereby radiation from said source passes through said measuring section and the amount of radiation impinging upon said detector is attenuated by said sludge, the configuration of said measuring section being effective to reduce back scattering of radiation from said radioactive material onto the detector.

3. In a sewage treatment system of the type including a pump for pumping sewage sludge through a pipe line from a tank to a digester, the improvement which comprises, means for measuring the density of sludge being pumped, said means comprising a transition pipe section connected in said pipe line, said transition section comprising a tapered inlet portion, a tapered outlet portion and a measuring section disposed intermediate said inlet portion and said outlet portion, said measuring section being of rectangular cross section and having two elongated side walls substantially longer than the diameter of said pipe line, said side walls extending transverse to the direction of fluid flow from the inlet to the outlet portions of said transition section, the measuring section of said transition section also having two narrow end walls of a width substantially smaller than the diameter of said pipe, the configuration of said transition section being effective to create a turbulent flow, increasing the homogeneity of the sludge stream in the measuring section, a point source of radioactive material, means mounting said point source of radioactive material adjacent to one narrow end wall of said transition section midway between the side walls, a detector effective to cause a current flow correlated with the amount of radiation impinging upon said detector, said detector having a diameter at least as large as the width of said end walls, and means mounting said detector adjacent to the opposite end of said measuring section whereby radiation from said source passes through said measuring section and the amount of radiation impinging upon said detector is attenuated by said sludge, the configuration of said measuring section being effective to reduce back scattering of radiation from said radioactive material onto the detector.

4. In a sewage treatment system of the type including a pump for pumping sewage sludge through a pipe line from a tank to a digester, the improvement which comprises, means for measuring the density of sludge being pumped, said means comprising a transition pipe section connected in said pipe line, said transition section comprising, a tapered inlet portion, a tapered outlet portion and a measuring section disposed intermediate said inlet portion and said outlet portion, said measuring section being of rectangular cross section and having an elongated dimension substantially greater than the diameter of said pipe line, said elongated dimension extending transverse to the direction of fluid flow from the inlet to the outlet portions of said transition section, the measuring section of said transition section also having a narrow endwise dimension substantially smaller than the diameter of said pipe, the configuration of said transition section being effective to create a turbulent flow, increasing the homogeneity of the sludge stream in the measuring section, a source of radioactive material, means mounting said source of radioactive material adjacent to one narrow end of said transition section, means for collimating the radiations from said source in a small beam through said measuring section, a radiant energy electric generator, said generator comprising two spaced electrically dissimilar electrodes and an ionizable gas in contact with said electrodes, said radiant energy electric generator being effective to generate an electrical current which is correlated with the amount of radiation impinging upon said generator, and means mounting said generator adjacent to the opposite end of said measuring section, whereby radiation from said source passes through said measuring section and the amount of radiation impinging upon said generator is attenuated by said sludge, the configuration of said measuring section being effective to reduce back scattering of radiation from said radioactive material onto the generator.

5. In a sewage treatment system of the type including a pump for pumping sewage sludge through a pipe line from a tank to a digester, the improvement which comprises, means for measuring the density of sludge being pumped, said means comprising, a transition pipe section connected in said pipe line, said transition section comprising, a tapered inlet portion, a tapered outlet portion and a measuring section disposed intermediate said inlet portion and said outlet portion, said measuring section being of rectangular cross section and having an elongated dimension substantially greater than the diameter of said pipe line, said elongated dimension extending transverse to the direction of fluid flow from the inlet to the outlet portions of said transition section, the measuring section of said transition section also having a narrow endwise dimension substantially smaller than the diameter of said pipe, the configuration of said transition section being effective to create a turbulent flow, increasing the homogeneity of the sludge stream in the measuring section, a source of radioactive material, means mounting said source of radioactive material adjacent to one narrow end of said transition section, means for collimating the radiations from said source in a small beam through said measuring section, a radiant energy electric generator, said generator comprising two spaced electrically dissimilar electrodes and an ionizable gas in contact with said electrodes, said radiant energy electric generator being effective to generate an electrical current which is correlated with the amount of radiation impinging upon said generator, and means mounting said generator adjacent to the opposite end of said measuring section, whereby radiation from said source passes through said measuring section and the amount of radiation impinging upon said generator is attenuated by said sludge, the configuration of said measuring section being effective to reduce back scattering of radiation from said radioactive material onto the generator, and a compensating radiant energy electric generator connected in parallel opposition to said first named radiant energy electric generator.

6. Apparatus for measuring the density of sludge flowing through a pipe, said apparatus comprising a transition pipe section connected in said pipe line, said transition section comprising a tapered inlet portion, a tapered outlet portion and a measuring section disposed intermediate said inlet portion and said outlet portion, said measuring section being of rectangular cross section and having two elongated side walls substantially larger than the diameter of said pipe line, said side walls extending transverse to the direction of fluid flow from the inlet to the outlet portions of said transition section, the measuring section of said transition section also having two narrow end walls of a width substantially smaller than the diameter of said pipe, the configuration of said transition section being effective to create a turbulent flow, increasing the homogeneity of the sludge stream in the measuring section, a point source of radioactive material, means mounting said point source of radioactive material adjacent to one narrow end wall of said transition section midway between the side walls, a detector effective to cause a current flow correlated with the amount of radiation impinging upon said detector, and means mounting said detector adjacent to the opposite end of said measuring section whereby radiation from said source passes through said measuring section and the amount of radiation impinging upon said detector is attenuated by said sludge, the configuration of said measuring section being effective to reduce back scattering of radiation from said radioactive material onto the detector.

References Cited in the file of this patent

UNITED STATES PATENTS

| | | |
|---|---|---|
| 2,661,550 | Graham | Dec. 8, 1953 |
| 2,722,609 | Morgan et al. | Nov. 1, 1955 |
| 2,737,592 | Ohmart | Mar. 6, 1956 |
| 2,763,790 | Ohmart | Sept. 18, 1956 |
| 2,951,156 | Miller | Aug. 30, 1960 |

FOREIGN PATENTS

| | | |
|---|---|---|
| 398,722 | Great Britain | Sept. 21, 1953 |

Disclaimer 3,070,692.—*Philip E. Ohmart* and *Henry L. Cook, Jr.*, Cincinnati, Ohio. SEWAGE SLUDGE DENSITY MEASURING APPARATUS. Patent dated Dec. 25, 1962. Disclaimer filed Dec. 4, 1964, by the assignee, *The Ohmart Corporation*.

Hereby enters this disclaimer to claims 1 through 6 inclusive of said patent.

[*Official Gazette March 16, 1965.*]